United States Patent [19]

Masuda et al.

[11] 3,941,637

[45] Mar. 2, 1976

[54] METHOD OF MANUFACTURING A CONVEYOR BELT AND AN APPARATUS THEREFOR

[75] Inventors: Takashi Masuda, Kobe; Shigeyuki Sozaki, Akashi; Masakatsu Ando, Minoo; Hideo Oumi, Komaki, all of Japan

[73] Assignee: Mitsubishi Belting Limited, Kobe, Japan

[22] Filed: Nov. 9, 1972

[21] Appl. No.: 305,026

[52] U.S. Cl. ............... 156/179; 156/436; 156/494
[51] Int. Cl.² .................... B29H 7/22; B65H 59/18
[58] Field of Search .......... 156/137, 178, 179, 229, 156/436, 437, 494, 161; 226/195; 425/3; 100/DIG. 17

[56] References Cited
UNITED STATES PATENTS

| | | | |
|---|---|---|---|
| 1,321,223 | 11/1919 | Marquette | 156/179 |
| 2,740,459 | 4/1956 | Kilborn et al. | 156/436 |
| 3,239,396 | 3/1966 | Bohannon, Jr. | 156/179 |
| 3,345,229 | 10/1967 | Harpfer | 156/494 |
| 3,348,585 | 10/1967 | Post et al. | 156/494 |
| 3,433,398 | 10/1967 | Fadden et al. | 226/195 |
| 3,607,561 | 9/1971 | Hutz et al. | 156/137 |

*Primary Examiner*—Daniel J. Fritsch
*Attorney, Agent, or Firm*—Sughrue, Rothwell, Mion, Zinn & Macpeak

[57] ABSTRACT

This invention involves manufacturing a conveyor belt by applying tension on a group of steel cords used as the belt tensile member, wrapping the tensioned steel cords with the rubber sheet to make a core body, sticking a based duck or a breaker and a covering rubber sheet in turn on said core body to build a belt, vulcanizing the belt and winding the resultant belt, in which the application of the tension to the group of steel cords is carried out by a plurality of pulleys on which hang a plurality of like weights respectively, and a winder.

14 Claims, 10 Drawing Figures

METHOD OF MANUFACTURING A CONVEYOR BELT AND AN APPARATUS THEREFOR

BACKGROUND OF THE INVENTION

1. FIELD OF THE INVENTION

This invention relates to a method of manufacturing a conveyor belt and an apparatus for executing the method, and more particularly to the conveyor belt having a group of steel cords as the tensile member.

2. DESCRIPTION OF THE PRIOR ART

The conventional tensile member, a conveyor belt, is composed of plural layers of tension elements made from woven cloth of cotton, rayon or various synthetic fibers. Recently steel cords have been utilized as the tensile member for the high strength conveyor belt. In a case of utilizing several hundreds of steel cords as the tensile member, each steel cord is required to have applied equal tension and to be embedded laterally in the belt.

If these works are omitted, the resulting conveyor belt will not become straight under operating conditions, and the embedded steel cord lengths become different from each other, thus causing irregular elasticity in the cross sectional area of the belt until it weaves, deforms and breaks down.

The known method of manufacturing a conveyor belt comprises passing a plurality of mutually parallel tensioned steel cords on a single or plurality of magnetic plates, applying a magnetic absorbing force to the steel cords thereby to cause a breaking force to the tension, and covering the rubber layers on and under the tensioned cords.

This method, however, cannot apply uniform tension on the whole steel cords because the magnetic plates do not produce equal absorbing force for the entire surface.

Therefore, an object of this invention is to provide a method and an apparatus for manufacturing a conveyor belt including the tensile member of the steel cords characterized by tensioning the steel cords with an electromagnetic roll assembly to impart a uniform and constant tension to each of the steel cords.

SUMMARY OF THE INVENTION

The method and apparatus of this invention have the following features:

1. The application of tension to the steel cords in the building and vulcanizing process is carried out by cords feeding rolls, weighting apparatus and drawing rolls of finished belt, without using the clamp and the said magnet plate.
2. At least one cord feeding roll is an electromagnetic roll.
3. The cord feeding roll constitutes a part of tension applying apparatus.
4. The electromagnetic roll has grooves to receive the steel cords.
5. The cross section of the grooves are V-shaped so that the steel cords having mutually different diameters are well fitted to the groove and applied under equal tension.
6. The building step to cover the tensioned cords with the core rubber is carried out by a movable building lorry.
7. The covering of the tensioned steel cords with the core rubber is carried out by the steps of introducing the cords between an upper roller having the grooves and a plain lower roller not having grooves and putting a lower core rubber sheet thereon, pressing the cords into the grooves of the upper roller, and then covering an upper rubber sheet on the cords and the thus constructed belt pressed with a flat press, in order.
8. The drawing roll is driven to draw out the vulcanizing belt and its rotation is restricted to one direction.
9. The motion of the drawing roll is synchronized with that of the building lorry so that the vulcanized belt is drawn out by the drawing roll and simultaneously the building lorry moves with the equal velocity towards the press.

The above said features and advantages of this invention will be clarified with reference to the accompanying drawings.

DESCRIPTION OF PREFERRED EMBODIMENTS

Figure 1:
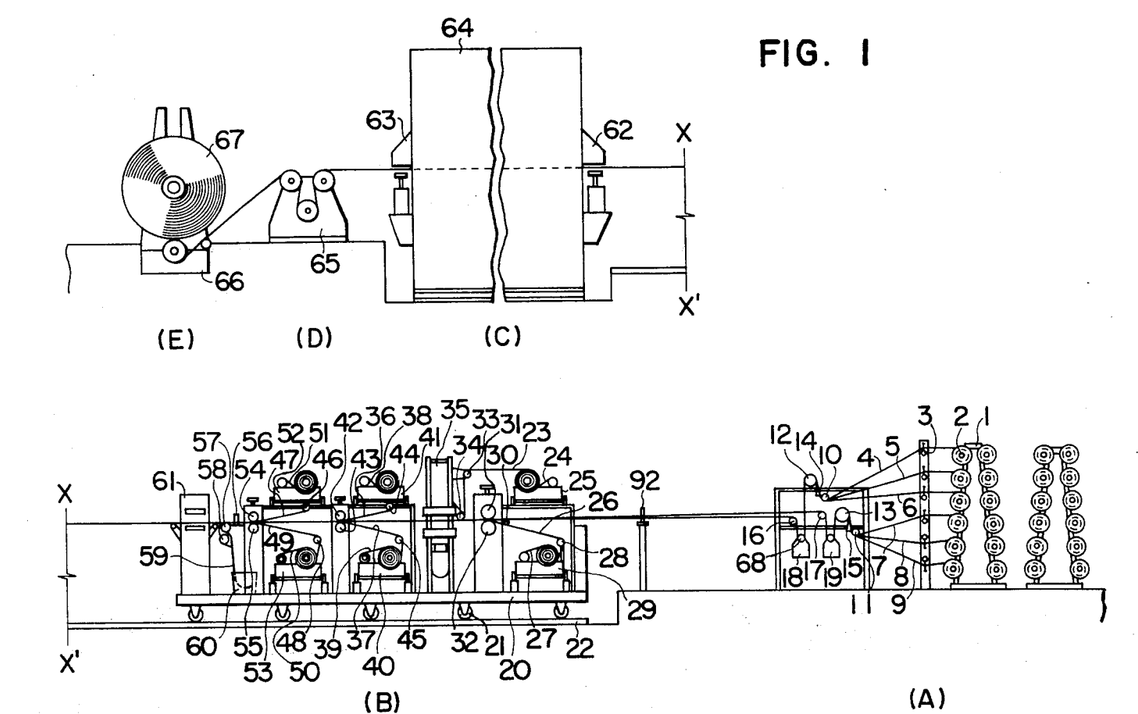
FIG. 1 is a schematic side view of the belt manufacturing apparatus of this invention, broken at line X — X.

FIG. 1 shows a diagram of the whole apparatus of this invention which is composed of tension applying apparatus A, building apparatus B, vulcanizing apparatus C, belt drawing apparatus D, and belt winding apparatus E.

In the tension applying apparatus A, 1 is a stand for reels 2, 3 is a comb for separating and arranging the cords, 10, 11 are carrying roll assembly, 12, 13 show an electromagnetic roll assembly for feeding the cords, 18, 19 are tensioning weights, and 16, 17 are receiving pulleys. The steel cord tensile members 4, 5, 6 and 7, 8, 9 which are drawn out from the reel 2 are separated and arranged horizontally by the comb 3, are conveyed along the circumferences of the carrying rolls 10, 11 to the electromagnetic rolls 12, 13. A plurality of V-shaped grooves, each for receiving therein the steel cord tensile members, are provided on the outer peripheries of the carrying rolls 10, 11 which are supported by a pair of bearings at both ends for free rotation. Flat guide plates 14, 15 prevent the irregular and non-uniform sticking of the steel cords 4, 5, 6 and 7, 8, 9 to the electromagnetic rolls 12, 13 in a zone between the carrying rolls 10, 11 and electromagnetic rolls 12, 13 in which zone the steel cords are lightly applied by tension.

A contact face between the guide plates and the tensile members is flat and the guide plates are provided near the electromagnetic rolls 12, 13.

The most important element in the tension applying apparatus A is the electromagnetic roll assembly 12, 13.

Figure 4:
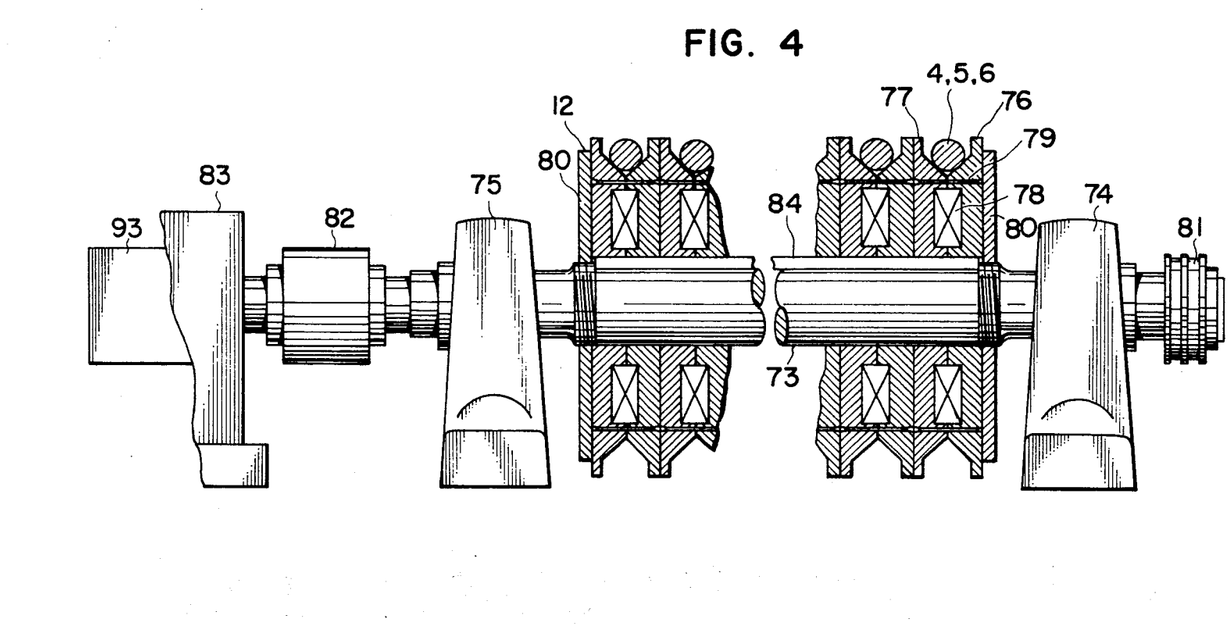
FIG. 4 is an enlarged and fragmentary cross sectional side view of the electromagnetic roll.

One of the electromagnetic rolls 12 is shown in FIG. 4, wherein each ring shaped electromagnetic core 78 is put between a pair of soft steel cores fitted by screws 79. A plurality of the core assemblies are inserted into a shaft 73 of the electromagnetic roll 12, and suppression plates 80 are applied to the respective ends of the core blocks. A key 84 is inserted through the core assemblies to prevent the mutual rotation. The outer periphery of the assembled electromagnetic roll 12 has a plurality of mutually parallel grooves formed by projections 76, 77. A current collector 81 is provided at one end of the magnet roll shaft 73 for supplying an exciting electric power via a small hole provided in the shaft 73.

The absorbing force of the electromagnetic rolls 12, 13 can be freely adjusted by an electrical control system (not shown).

The electromagnetic roll shaft 73 is supported by a pair of bearings 74, 75 and connected to driving equipment 83 via a coupling 82. The driving equipment 83 is actuated together with a drawing roll 65 and a winder 66 for winding the vulcanized belt, and draws out the length of the tensile member corresponding to that of the wound belt from the reel 2.

On the other hand, the rotation of the electromagnetic rolls 12, 13 caused by the tension of steel cords due to weight 18, 19 is prevented by the braking equipment, except when actuated by the driving equipment.

Figure 2:
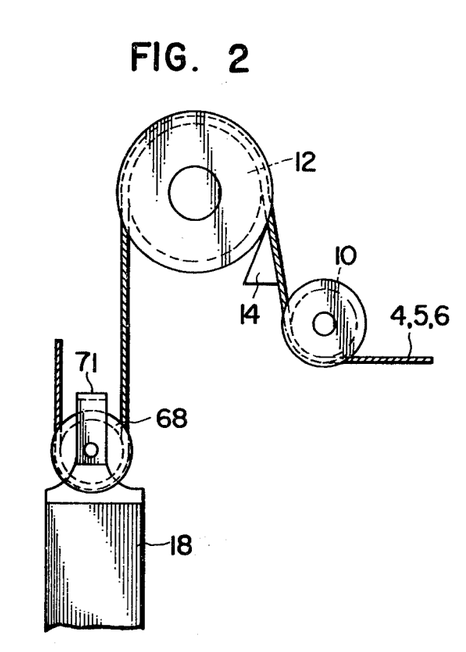
FIG. 2 is an enlarged side view of the electromagnetic roll of the tension applying apparatus and weighting apparatus shown in FIG. 1.
Figure 3:
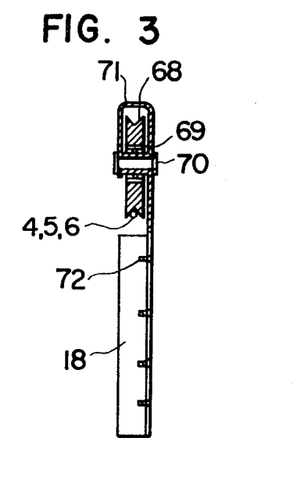
FIG. 3 is a sectional view showing a structure of the weighting apparatus.

The steel cord tensile members 4, 5, 6 and 7, 8, 9 wound on the electromagnetic rolls 12, 13 extend to the receiving pulleys 16, 17 and are tensioned by weights 18, 19, as shown in the FIG. 2 and FIG. 3.

A pulley 68 is rotatably supported on a weight arm 71 extending upwards from a weight 18 via a pulley shaft 70 and a ball bearing 69. A V-shaped groove is provided on the outer periphery of the pulley 68 to receive the steel cord tensile members 4, 5 and 6. Receiving pulleys 16 and 17 above the weight 18 are mutually isolated and have also the V-shaped grooves on the outer peripheries to receive the steel cords.

Thus, the steel cords tensile members 4, 5, 6, 7, 8 and 9 are wound on the grooves on the electromagnetic rolls 12 and 13, advance upwards through a pulley 68 and are guided to the building apparatus B via the receiving pulleys 16 and 17.

The tensile member is eventually applied a tension corresponding to one-half of the weight by the weighting apparatus. The electromagnetic rolls 12 and 13 keep the weight in the suspended state.

As particularly described above, the electromagnetic roll 12 or 13 has numbers of peripheral grooves corresponding to that of the tensile members, and also has the corresponding numbers of ring shaped electromagnetic coils 78, so that the wound tensile member 4–9 are pulled and abosrbed in the grooves on the electromagnetic rolls by the magnetic force generated from the excited electromagnetic coils 78. This pulling and absorbing force is large enough to suspend the weights.

Figure 5:
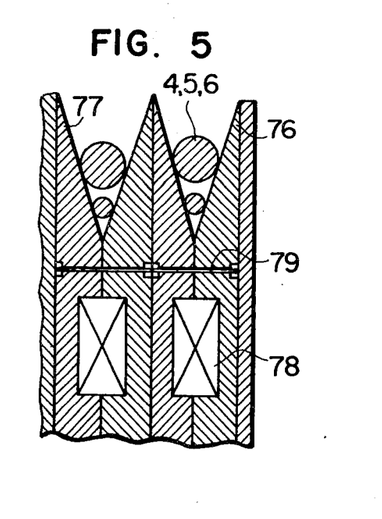
FIGS. 5-8 show enlarged cross sections of the various modifications of the grooves on the electromagnetic roll.
Figure 6:
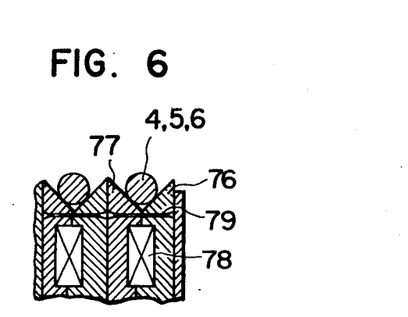

FIGS. 4–8 show several examples of the cross sections of the grooves on the rolls to receive therein the tensile member. The depth of the V-shaped groove having the dull angle as shown by the FIG. 6 is restricted to the small level in relative to the pitch of the cord tensile member. The tensile member is not fully put in the shallow groove and often shifts in the neighboring groove during the tensile member feeding work.

Figure 7:
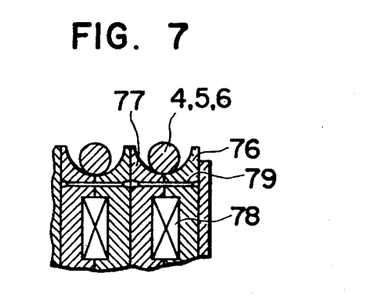
Figures 8, 9:
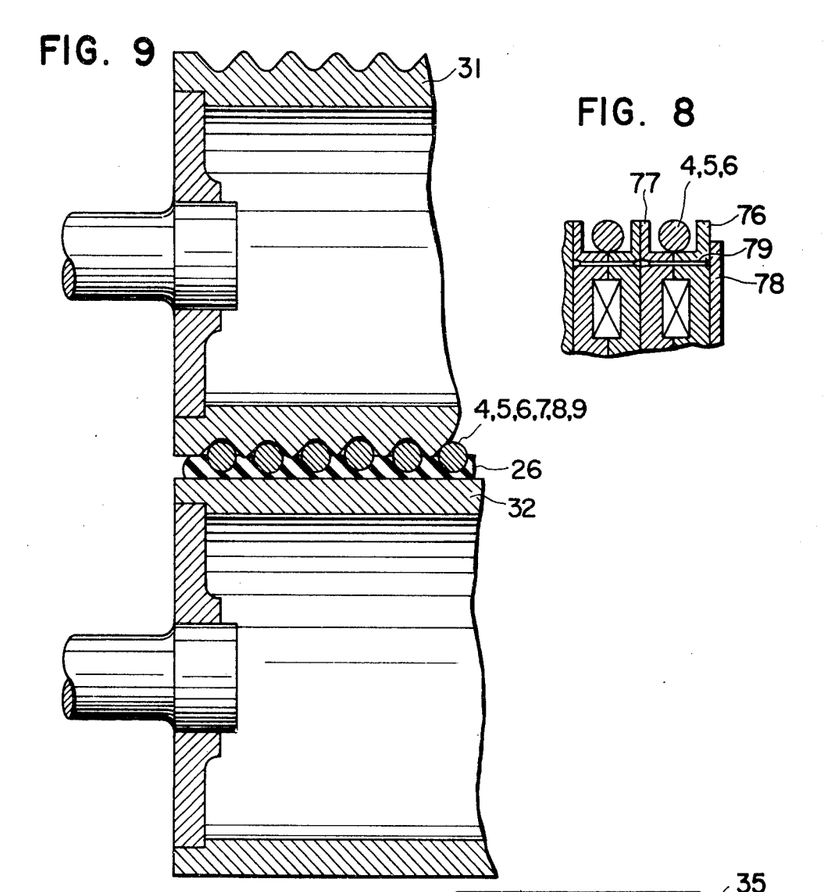
FIG. 9 is an enlarged cross section of the building apparatus.

The groove of the semicircular or U-shaped cross section, as shown by the FIG. 7 or FIG. 8, has such a defect that the centerline of the tensile member is hard to coincide with that of the groove, thus making it difficult to keep constant the pitch of the tensile member and causing meandering of the tensile member on the groove.

The groove in FIG. 4 is the same as that in FIG. 6 except that it has a pair of vertical isolation walls, intended to eliminate the defects observed in the grooves of FIGS. 6–8. Using this special groove of FIG. 4, the tensile member is always wound rightly on the centerline of the groove, and the cord absorbing force is promoted by the electromagnetic absorbing force, the tension caused by the weighting apparatus 18, 19 and a wedge effect of the tensile member in the groove, thus enabling to hold surely the tensile member on the electromagnetic roll. The groove shown in the FIG. 5 has a sharp angle.

The steel cords having various diameters are held by the sharp groove at suitable heights, respectively. As an amount of flux applied to a steel cord by the electromagnetic roll is different from that applied to the other steel cord, the steel cord having mutually different diameters are wholly absorbed by the electromagnetic roll with substantially uniform strength, to apply constant tension to the tensile member.

Therefore, the sharp V-groove is most preferable among other grooves, since any of the tensile members having mutually different diameters can be fixedly held by the groove at a suitable position without fear of shifting to the neighboring groove.

The shape of the groove on the electromagnetic roll is not restricted to that described above and shown in the Figures but includes any one exhibiting the substantially equal functions and bringing out similar effects.

The length of the tensile member 4–9 is drawn out from the reel in proportion to the rotation of the electromagnetic roll; meanwhile, the electromagnetic absorbing force from the electromagnetic roll is controlled so as not to draw out an excess length of the tensile member.

The wrapping angle of the tensile member to the electromagnetic rolls 12, 13 in the tension applying means is preferably about 170° as taking the facility of the first application of the tensile member to the electromagnetic roll into consideration, in spite of the fact that the effective absorbing force is increased by shifting the guide rolls 10, 11 and the guiding plates 14, 15 towards the weighting apparatus 18, 19 and increasing the wrapping angle.

The tensile members 4–9 thus tensioned properly by the tension applying apparatus A are arranged by a comb 92 to satisfy a pitch arrangement of a belt and fed into the following building apparatus B.

The building apparatus B mounted on a movable lorry 20, which is equipped with wheels 21 running on a rail 22, is composed of an upper grooved roll 31, a lower plain roll 32, both serving as a pair of first rolls, a press 35 for the core assembly obtained from the first roll, and a series of second rolls 42, 43 and third rolls 54, 55 for sticking the breaker, the cover rubber and the like to the core rubber.

The tensile member 4, 5 and 6 introduced into the building apparatus B are first fed between the upper grooved roll 31 and the lower plain roll 32 together with the sheet 26 of the lower core rubber which is delivered from a holder 27 on a table 29 via a guide roll 28. Then the lower half of the tensile member is thrust into the unvulcanized rubber sheet 26 as shown in FIG. 9 and the V-shaped grooves of the grooved roll 31 arranged at regular intervals corresponding to the pitch of the tensile members and having a depth as to project the upper half of each said tensile member from the surface of the rubber sheet 26.

After that, the tensile member carried by the lower core rubber is conveyed to the press 35 and covered or laminated with an upper core rubber 23 thereon which is fed from a holder 24 on the table 25 via guiding rolls 33, 34, and then compressed.

This compression is usually carried out while the tensile member layers and the building lorry 20 are stopped.

After applying the lower core rubber 26 of one press 35 length to the tensile member while the building lorry 20 runs, the lorry is stopped to compress and apply the upper core rubber thereon.

This two step work is repeated to produce the core belts.

Figure 10:
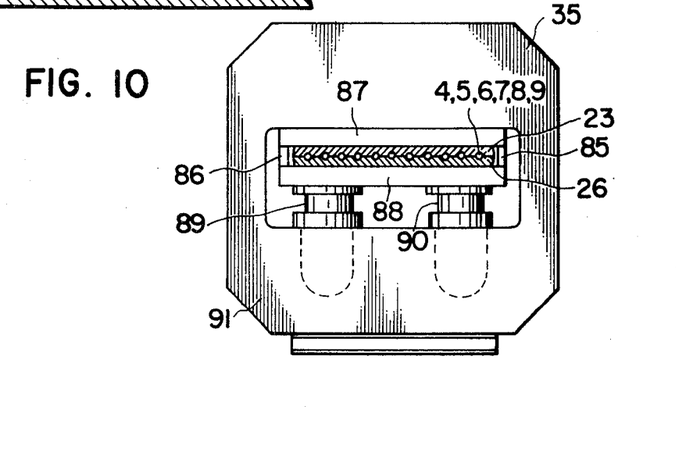
FIG. 10 is a front view of the press part of the apparatus seen from a running direction of the tensile member.

FIG. 10 shows the condition of the building press, where the lower half of the tensile member is well embedded in the lower core rubber 26, and the embedded tensile member is able to fix and unify with the core rubber by slight tensile force without disturbance. In order to keep the whole thickness of the resulting core body at the desired value, a pair of edge irons, i.e., a gauge block having the equable thickness, 85 and 86 are inserted between an upper plate 87 of the press and a lower plate 88 mounted on a pair of hydraulic cylinders 89 and 90, as padded to both edges of the core body. Both upper and lower surfaces of the core body thus obtained are stuck with a based duck or a breaker reinforcing cloths 36 and 37 by a pair of second rolls 42 and 43 and successively a pair of cover rubber sheets 47 and 48 are further stuck to the core body by means of a following pair of third rolls 54 and 55.

The sticking works are carried out while the core body is stopped, the building lorry is driven and a pair of the first rolls 31 and 32 are actuated.

After sticking the cover rubber to the core body, excess rubber at both edges of the resultant belt is cut off by a trimming cutter 56 to keep the belt of constant width. The cut off excess rubber 59 is conveyed to a receiving tray 60 by rolls 57 and 58.

The resultant belt is then passed through a talc powder spraying station 61 to prevent the sticking of the belt to the press during the vulcanizing treatment, fed into a vulcanizing apparatus C and therein heated and compressed by vulcanizing press 62, 63 and 64 of known construction.

The vulcanized belt is successively drawn out by a drawing apparatus 65 in the D block, and wound by winder apparatus 66 in the E block.

The tensile members 4–9 are subjected to constant tension through the working line between the tension applying apparatus A and the belt drawing apparatus D. While the one press length of the core body is introduced into the vulcanizing press and vulcanized therein, the tensile members are kept stationary. While the one press length of the core body is vulcanized, the building lorry runs gradually from a position near the press towards the electromagnetic roll as executing the building works prepare the same length of the newly formed core body for the next vulcanizing treatment.

Therefore, the reciprocating stroke of the building lorry must be the same length of the vulcanizing press. If necessary, the vulcanized core belt is clamped by the forming press 35 not to apply an unexpected load on the setting and forming rolls during their running towards the press.

A constant tension is applied to the belt between the winder 66 and the drawing roll 65 by the former to give the slack side tension and to enable the drawing of the belt. The drawing roll 65 serves to fix the vulcanized belt to impart the tension on the latter between the drawing roll 65 and the electromagnetic rolls 12 and 13 together with the weights 18 and 19.

Now, the merits and advantages of this invention are described hereinafter.

The tension applied to the tensile member (steel cord) can be surely maintained between the electromagnetic roll and the drawing roll.

The tensile member can be held on the desired position in the groove of the electromagnetic roll irrespective of the length of the diameter, and absorbed by the magnet roll with the constant magnetic absorbing force, thus causing the constant tension on the tensile member without loosening in every process. Therefore, special storage means and tension control system are not required for exactly keeping the uniform tension and producing the high quality conveyor belt.

As the tensile members are held fixedly in the grooves on the lower core rubber layer at the regular intervals, the laminating of the upper core rubber layer can be carried out under the slightest tension without disturbing the interval or pitch of the tensile members, otherwise required to apply the high tension on the tensile member as in the usual manner.

The use of the rotative electromagnet roll makes unnecessary the clamping of the tensile member and enables the tensile member to be held fixedly while stepped irrespective of the strength of the friction between the tensile member and the reel. On the other hand, the tensile member is conveyed instantaneously upon rotating electromagnetic roll.

As the application of the tension to the tensile member is carried out exactly by both the electromagnetic rolls and the hanging weights, the fear of causing irregular tension on the tensile member is not expected at all.

The use of the electromagnetic roll makes unnecessary the provision of the large scaled clamping press and the festoon for storing one vulcanizing length of the steel cord.

In addition to that, the structure of the apparatus of this invention is made very compact and small-scaled as compared with that of conventional apparatus, and the easiness of the handling and operation brings out the reduction of the belt manufacturing cost and the high working efficiency.

While this invention has been described with reference to particular embodiments thereof, it will be understood that the numerous modifications may be made by those skilled in the art without actually departing from the scope of this invention.

Therefore, the appended claims are intended to cover all such equivalent variations as coming within the true spirit and scope of this invention.

What is claimed is:

1. A method of manufacturing a conveyor belt having a plurality of longitudinal steel cord tensile members comprising the steps of:

a. unwinding said tensile members from storage reels;
b. placing the tensile members in a groove around the periphery of a feeding roll including at least one magnetic roll so as to retard their movement;
c. hanging on said tensile members a plurality of pulleys, each having a weight attached thereto;
d. applying a first rubber sheet to one side of said tensile members;
e. applying a second rubber sheet to the other side of said tensile members after said first rubber sheet has been applied to said one side;
f. compressing said rubber sheets to cause them to completely surround said tensile members to form a core body;
g. applying a biased duck or breaker material to both sides of said core body;
h. applying a rubber cover sheet to both sides of the belt;
i. vulcanizing the belt; and
j. winding said vulcanized belt onto a finish storage roll.

2. The method of manufacturing a conveyor belt according to claim 1, further comprising forming the electromagnetic roll with grooves of V-shaped cross section capable of receiving therein a tensile member of various diameter at any desired position in the groove to enable pulling the steel cord towards the electromagnetic roll with a constant force.

3. The method of manufacturing a conveyor belt according to claim 1, wherein the first rubber sheet and pluralities of tensile members are applied to each other between an upper grooved roll, whose peripheral surface comprises a plurality of mutually parallel V-shaped grooves having a depth to hold therein, the lower half of the tensile members arranged at regular intervals corresponding to the pitch of the steel cords, and a lower plain roll, and compressing the resultant lamination and the second rubber sheet thereon, to cause them to adhere together.

4. The method of manufacturing a conveyor belt according to claim 1, in which a length of the tensile member corresponding to that of the vulcanized portion is fed by the rotation of the electromagnetic roll, and the vulcanizing of the belt is carried out while the electromagnetic roll is stopped by a braking equipment provided at one end of the driving equipment to keep the steel cords in a stationary stage.

5. The method of manufacturing the conveyor belt according to claim 1, further comprising reciprocating a building apparatus on a building lorry in parallel to the running direction of the steel cords, gradually moving the building lorry from a position near the vulcanizing apparatus towards the electromagnetic roll during the vulcanizing and building of the belt and then moving the lorry towards the vulcanizing apparatus with a velocity equal to that of the vulcanized belt.

6. An apparatus for manufacturing a conveyor belt having a plurality of longitudinal steel cord tensile members comprising:
a. storage means to store said tensile members;
b. means to apply a constant tension to said tensile members as they are removed from said storage means, said constant tension means having a feeding roll assembly with at least one electromagnetic roll provided on its periphery with grooves of V-shaped cross section capable of receiving therein the tensile members of various diameter at any desired position in the groove and to thereby draw the tensile members toward the electromagnetic roll with a constant force to retard their movement, and a plurality of pulleys, each having a plurality of tensioning weights, said plurality of pulleys located downstream of said at least one electromagnetic roll;
c. first means for applying a first rubber sheet to one side of said tensile members;
d. second means for applying a second rubber sheet to the other side of said tensile members, said second means being displaced longitudinally with respect to said first means;
e. means to compress said first and second rubber sheets to cause them to enclose said tensile members, to form a core body;
f. means for applying a biased duck or breaker to both sides of said core body;
g. means for applying a rubber cover sheet to both sides of said duck or breaker material;
h. means for vulcanizing the constructed belt; and
i. means for winding the vulcanized belt on a finish storage reel.

7. The apparatus for manufacturing a conveyor belt according to claim 6, in which each of the electromagnetic rolls has a plurality of grooves at its outer periphery for receiving therein the tensile members and includes electromagnetic coils at the positions corresponding to the grooves.

8. The apparatus for manufacturing a conveyor belt according to claim 6, in which the cross section of each of said grooves is V-shaped and is provided with a vertical isolation wall at each side of the groove.

9. The apparatus for manufacturing a conveyor belt according to claim 6, in which each groove is able to receive therein the tensile member of any diameter at the desired position in the groove and to pull the tensile member with the same strength towards the electromagnetic roll, and therefore, constant tension can be applied to the tensile member.

10. The apparatus for manufacturing a conveyor belt according to claim 6, in which said electromagnetic roll is connected to a driving means which is actuated synchronously with the apparatus for winding the vulcanized belt, the driving means actuates the electromagnetic roll angularly corresponding to the length of the fed tensile member or the length of the wound vulcanized belt, and a braking apparatus is attached to one end of the driving means to stop the electromagnetic roll during the stopping of the driving means.

11. The apparatus for manufacturing a conveyor belt according to claim 6, in which the means for applying the first and second rubber sheets, the means for compressing said sheets, the means for applying the breaker and the means for applying the rubber sheet are supported on a building lorry capable of reciprocating parallel to the steel cord running direction.

12. The apparatus for manufacturing a conveyor belt according to claim 11, in which the building lorry is gradually moved from a position near the vulcanizing apparatus towards the electromagnetic roll during the vulcanizing and building of the belt and then moved towards the vulcanizing apparatus with a velocity equal to that of the vulcanized belt.

13. The apparatus for manufacturing a conveyor belt according to claim 6, in which the first means for applying said first rubber sheet is equipped with an upper grooved roll and a lower plain roll for applying the core rubber sheet to one side of the tensile members.

14. The apparatus for manufacturing a conveyor belt according to claim 13, in which the grooves of the grooved roll are formed to a depth so as to hold therein, the lower half of the steel cord and are arranged in regular intervals corresponding to the pitch of the steel cords.

* * * * *

UNITED STATES PATENT AND TRADEMARK OFFICE
CERTIFICATE OF CORRECTION

PATENT NO. : 3,941,637
DATED : March 2, 1976
INVENTOR(S) : Takashi MASUDA ET AL

It is certified that error appears in the above-identified patent and that said Letters Patent are hereby corrected as shown below:

In the Heading:

The Assignee's name is incorrect, should read:

--MITSUBOSHI BELTING LIMITED--

Signed and Sealed this

Sixth Day of July 1976

[SEAL]

Attest:

RUTH C. MASON
*Attesting Officer*

C. MARSHALL DANN
*Commissioner of Patents and Trademarks*